May 21, 1929. MacCORMICK G. MOORE 1,713,614
TRACK BELT LINK
Filed Aug. 3, 1925
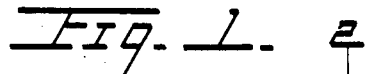
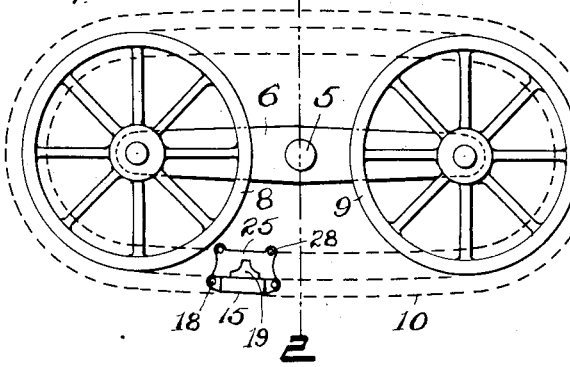
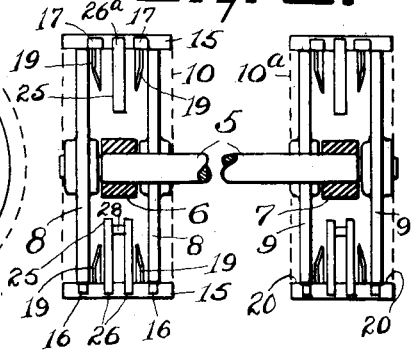
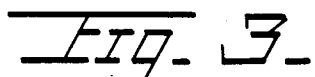
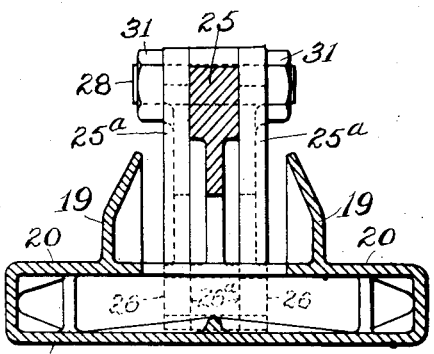
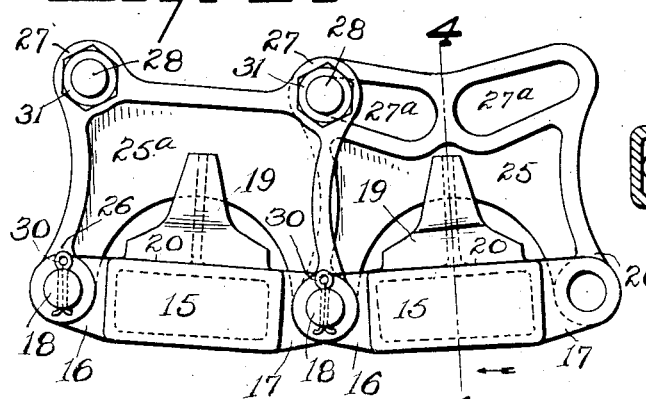
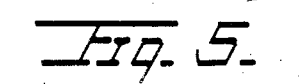
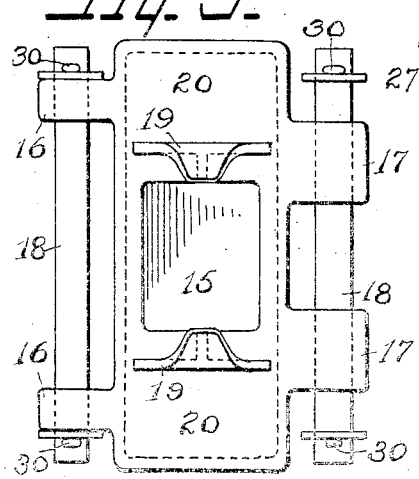
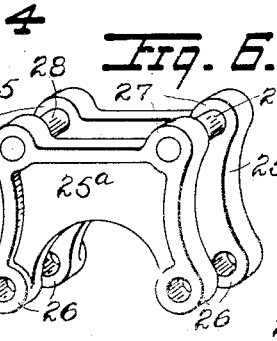
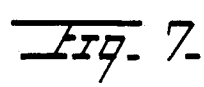
MacCormick G. Moore, INVENTOR.
ATTORNEYS.

Patented May 21, 1929.

1,713,614

UNITED STATES PATENT OFFICE.

MacCORMICK G. MOORE, OF WYOMISSING, PENNSYLVANIA, ASSIGNOR TO MOORE & MOORE, INC., OF READING, PENNSYLVANIA, A CORPORATION OF PENNSYLVANIA.

TRACK BELT LINK.

Application filed August 3, 1925. Serial No. 47,694.

My invention relates to link belts adapted to form an endless track or tread for the wheels of a cart or the like, so as to enable the same to ride more easily over soft or rough ground, and it consists in the improved construction of the separate links forming such belt, as more fully described in connection with the accompanying drawings, and specifically set forth in the subjoined claims.

Fig. 1 is a diagrammatic view illustrating the spaced side wheels of a known cart, with an endless link belt track bent around the same, only a single link being shown and the remainder of the belt indicated by dotted lines.

Fig. 2 is a cross-sectional view on the line 2—2 of Fig. 1, indicating the two belts employed.

Fig. 3 is an enlarged side elevation of a preferred form of link, showing two adjacent links pivotally connected together.

Fig. 4 is a cross-sectional view on the line 4—4 of Fig. 1.

Fig. 5 is a separate plan view of one of the tread members shown in Fig. 3.

Figs. 6 and 7 are separate views of the two truss members shown in Fig. 3, the same being shown in slightly reduced scale.

The type of vehicle indicated in Fig. 1, is well known and comprises a cart-supporting axle 5, on which are intermediately mounted side frames 6 and 7, and each frame is provided at its ends with a pair of freely rotatable load-carrying wheels 8, 8 and 9, 9. Two endless belts 10 and 10ª, are employed, each one bent around the front and rear pair of wheels of a side frame, and each forming an endless ground engaging track upon which the respective wheels ride in usual manner.

Belts of this nature are well known and my present invention relates to an improved construction of the separate links forming the same, my main object being to provide a strong and durable link, desirably built up of separate tread and truss members simply united, and permitting preferred combination of cast and forged parts for maximum strength with minimum weight.

Referring more particularly to Figs. 3 to 7, each link comprises a tread member 15 and a separate truss member 25. The tread member 15 is preferably formed as a hollow casting, as shown, suitably reinforced as desired with internal ribs or pillars, and provided with apertured projections 16, 16 and 17, 17, the same forming pivot ears adapted to interfit with projections of a similar tread member, and pivotally connectable to the latter by pivot pins 18. I also preferably form each tread with integral spaced guards 19, 19, as shown, extending inwardly from the inner face of each tread member and defining the wheel contacting portions 20, 20, of each tread; said guards projecting between the frame-carried wheels 8, 8 and 9, 9 to retain the belts on the latter.

To prevent sagging of the belt between the supporting end wheels 8, 8 and 9, 9, and preferably to provide an outward bowing or curvature of the same, as indicated in Fig. 1, so as to facilitate turning of the cart and easy riding over rough ground, as well understood, I provide truss members 25 and 25ª, adapted to slidably connect the links and limit the pivotal movement of the latter on their connecting pins 18.

In the preferred construction shown in the drawings, the truss member for alternate links is formed, as shown separately in Fig. 6, of two similar parts 25ª, 25ª, having spread projecting ends 26, 26, apertured to engage with connecting pins 18, and with apertured opposite ends 27, 27, which are connected by pins or bolts 28, 28. The truss member 25 of the intermediate links, as shown separately in Fig. 7, is of a single thickness adapted to enter between the spaced parts 25ª, 25ª, of an adjacent link truss member, and is provided with projecting ends 26ª, 26ª, apertured to engage connecting pins 18, and its opposite end provided with slotted apertures 27ª, 27ª, in which the pins 28, 28, of adjacent truss members slidably engage. These truss members are preferably forged for greater strength and partly reduced in thickness, as shown, for lightness, and the distance between pins 28, 28 and the ends of slots 27ª, 27ª, is preferably less than the distance between the connecting pins 18, 18, so that a determined bowing of the pivotally connected links is secured, for the purpose heretofore set forth, while permitting a free pivotal closing together of the links in the opposite direction to provide for bending around the vehicle wheels.

It will be seen that the ends 26, 26, and 26ª, 26ª, entirely fill the space between the apertured projections 17, 17, and the latter, with projections 16, 16 of an adjacent link, interfit with projections 17, 17, to enclose and protect the pins 18 against direct contact with stones or the like. End washers 29 and cotter pins 30, as shown, retain pins 18 against displacement, while nuts 31 are shown as retaining pins 28, 28 in place, but other means may obviously be employed.

The prefered hollow reinforced tread member 15 shown, may be readily cast and provides ample strength with minimum weight to withstand the shocks and crushing strains to which it is subjected in service, while the forged members 25, 25ª provide simple strong truss connections for the treads 15; this two part structure permitting easy replacement of a broken part instead of replacement of an entire new link.

The preferred construction shown and described may obviously be modified without departing from the spirit of my invention as defined in the following claims.

What I claim is:—

1. A link truss belt for vehicles consisting of a plurality of connected links each of which comprises a tread member and a separate truss member, the truss member of each alternate link comprising spaced portions adapted to receive between them the truss members of adjacent links, pins connecting said spaced portions and slidably engaging slotted apertures of said adjacent truss members, and separate connecting pins pivotally interlocking adjacent portions of the tread and truss members.

2. A link truss belt for vehicles consisting of a plurality of connected links each of which comprises a tread member having spaced raised guards defining outer vehicle-wheel contacting portions, and adjacent pivot projections adapted to interfit with pivot projections of a similar tread; a separate truss member between said guards having apertured projections adapted to register with said tread pivot projections, the truss member of each alternate link comprising spaced plates adapted to receive between them adjacent link truss members; pins connecting said spaced truss plates and slidably engaging slotted apertures of said adjacent truss members; and separate connecting pins pivotally engaging the registering tread and truss projections of adjacent links.

In testimony whereof I affix my signature.

MacCORMICK G. MOORE.